United States Patent
Poggio

[11] 3,837,660
[45] Sept. 24, 1974

[54] COMPOSITE SEAL RING

[76] Inventor: Mario Poggio, c/o Mongul, Supertex s.p.a., Via Torino N 220/222, 10040 Leini, Turin, Italy

[22] Filed: Apr. 24, 1972

[21] Appl. No.: 247,081

[30] Foreign Application Priority Data
Jan. 12, 1972  Italy ................................. 67085/72

[52] U.S. Cl.................. 277/227, 277/153, 264/241
[51] Int. Cl............................................. F16j 15/00
[58] Field of Search................... 277/227, 153, 182; 264/241, 260

[56] References Cited
UNITED STATES PATENTS
2,370,913  3/1945  Procter ............................... 277/227
2,930,643  3/1960  Mastrobattista et al. ............ 277/153
3,121,133  2/1964  Mathues ............................. 264/241
3,493,645  2/1970  Sanderson et al............ 277/227 UX Primary Examiner—Samuel B. Rothberg
Attorney, Agent, or Firm—Ladas, Parry, Von Gehr, Goldsmith & Deschamps

[57] ABSTRACT

Seal rings for rotating shafts are manufactured by locating or causing to be supplied in a mould having the shape of the complete ring two materials having a chemical affinity and suitable the one to embody the outer rigid part and the other to embody the inner flexible part of the ring, and by effecting the polymerization of said materials.

The seal ring thus obtained consists of a single piece of synthetic material, rigid in its outer part and flexible in the internal part corresponding to the seal lip.

1 Claim, 2 Drawing Figures

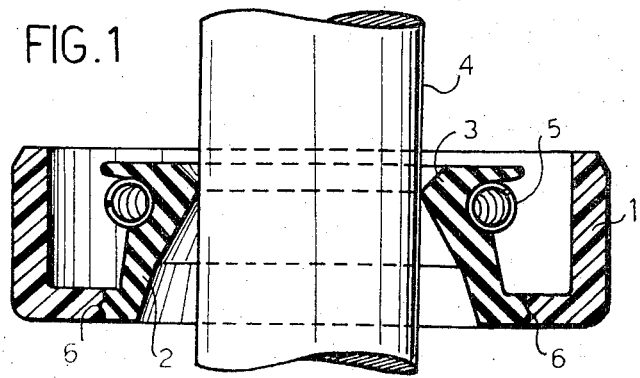
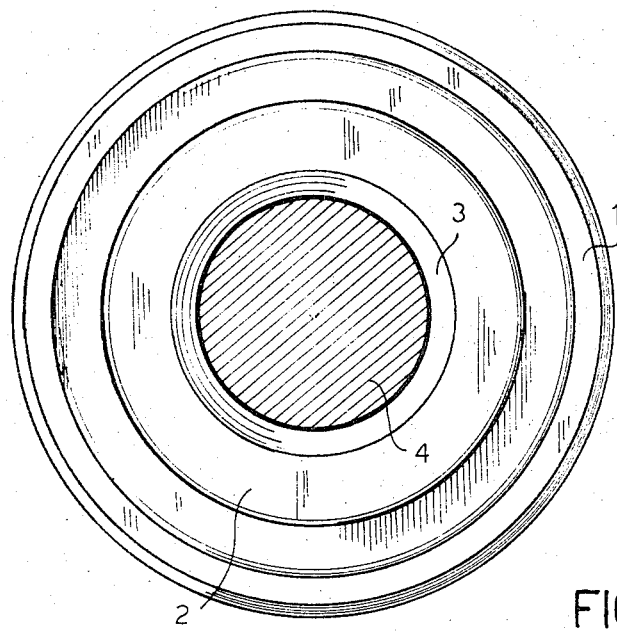

COMPOSITE SEAL RING

The present invention relates to a process for manufacturing seal rings for rotating shafts. Another object of the invention is the products obtained by said process.

The seal rings serve the specific function of preventing fluids (oils, water, greases, etc.) from escaping from mechanical members which either are driven or drive other members by means of shafts. Said seal rings can be also used in order to prevent damaging outer agents (water, dust, etc.) from entering into parts of machines. Said rings consist of a body of elastic material provided with a lip capable of embodying the seal on the shaft, and of a reinforcement serving the function of stiffening and strengthening the seal ring, which can be thus located in its seat, and there remain firmly. This reinforcement is usually made of steel plate, having a thickness variable according to the diameter of the ring.

The manufacture of the steel reinforcement requires preparing treatments on the same, such as degreasing, phosphatizing or sandblasting, treatments which serve the purpose of preserving the metal part against oxidation, and particularly as far as sandblasting is concerned, of increasing the adhesion surface with the rubber. It is necessary, furthermore, to varnish by suitable systems the metal part with adhesives of suitable type in order to firmly anchor the metal to the elastic part of the ring.

The above operations imply remarkable drawbacks which are well known to the persons skilled in the art.

Said drawbacks are removed according to the present invention, which aims to embody the seal ring in a single piece made of synthetic material and by a single operation. This result wil be attained due to the fact that the ring consists of a semirigid outer part and of an inner flexible part, molecularly bound during the polymerization stage. The two parts consist of substances having a chemical affinity in order to obtain their mutual adhesion, as the sole pressure exerted by the various kinds of mouldings would not be sufficient to steadily connect said parts. The final ring which will be obtained by the co-polymerization of the parts, is sufficiently rigid to be put in operation in its seat by the common tools, while cannot be removed therefrom without breaking it.

This invention affords a double set of advantages. On one side, as no metal reinforcement exists, the degreasing, phosphatization or sandblasting processes and the treatment for rendering adhesive the metal (which, in the uncovered zones, will remain subject to the possible subsequent oxidation) are no more required.

On the other side, this invention allows the two parts of the ring to be manufactured by a single operation by simultaneous moulding, either by compression or by injection. It is evident that a great economy will be thus obtained in the mass production.

One embodiment of this invention will be now described with reference to a particular type of seal ring, shown in the attached drawing, wherein:

FIG. 1 shows an axial sectional view of the ring;

FIG. 2 shows a front elevational view of the ring of FIG. 1.

With reference to the drawing, the ring according to this invention comprises an outer rigid part 1 and an inner flexible part 2. The part 1 has its usual shape, suitable to be inserted into the ring seat. The part 2 is provided with the lip 3 which embodies the seal on the shaft 4. In register with the lip 3, in the inner part, the annular spring 5 is provided as usual.

The two parts of the ring are manufactured by a general base formulation, by changing the doses of the single ingredients.

One preferred composition is as follows:

| Base Composition | Parts by Weight | |
| --- | --- | --- |
|  | Rigid Part | Flexible Part |
| Elastomer: Rubber containing butadiene-acrylonitrile copolymer where preferably the contents of acrylonitrile is held between 25% and 50% | 75 to 90 | 90 to 100 |
| Fillers: Magnesium oxide and silicic acid with a diameter of particles comprised between 2 and 15 microns | 500 to 1000 | 100 to 500 |
| High abrasion furnace type carbon black | 80 to 100 | 50 to 80 |
| Fiberglass | 100 | — |
| Fenolic resin | 30 to 50 | 5 to 30 |
| Plasticizer: Propanetrimethylol-acrylic ester | 4 to 20 | 30 to 100 |
| Additives: Lauric acid | 7 to 10 | 1 to 6 |
| Tert. butyl-peroxy-isopropyl-benzene | 8 to 15 | 2 to 6 |

The polymerization of both the rigid part and of the flexible part is obtained by treatment for 5 minutes at 170°C.

The two selected compositions are separately mixed with the usual factory equipments, i.e., open or closed mixers, and are prepared for moulding by one of the crude preparation methods, i.e., calendering, granulation, drawing, etc.

This invention allows the use of very strong reticulating agents to be rendered general, with a consequent improvement of the thermal resistances, which are essential in the seal rings.

In case of moulding by compression, the two materials (resin and elastomer) are located in the mould and the polymerization is then carried out normally. In the injection moulding the two materials are injected simultaneously by two separate injectors in the closed mould, and the polymerization is then carried out.

The sole condition to be complied with is that the resin will fill the mould up to the beginning of the seal lip, as shown by the lines 6 of FIG. 1.

It is clear that the process according to this invention can be applied to all kinds of seal rings, with one lip, with two lips, with an auxiliary lip, etc. as well as to all forms of seal lips. The point where the rigid part is to be terminated and the flexible part must begin, will be easily determined each time, provided that the aforecited condition will be complied with.

Having thus described the present invention, what is claimed is:

1. A seal ring for rotating shafts constituted by a material being hard in the outer part of the seal ring arranged for fitting in a suitable annular retaining housing, and relatively resiliently pliable in its inner part arranged for making a sealing contact with a rotating shaft, characterized in that the body of said seal ring comprises the same base elastomer and additives in different percentages in the inner and outer part of said body so that, after curing, the outer part of said body results relatively hard and said inner part of said body results relatively resiliently pliable, said body being obtained by the contemporaneous curing of the elastomer; said elastomer comprising a butadiene-acrylonitrile copolymer where preferably the contents of acrylonitrile is held between 25 percent and 50 percent in weight, the distribution of said additives in the rigid and flexible part being as follows:

| | rigid part | flexible part |
|---|---|---|
| Magnesium oxide and silicic acid with a diameter of particles comprised between 2 and 15 microns | 500 to 1000 | 100 to 500 |
| High abrasion furnace type carbon black | 80 to 100 | 50 to 80 |
| Fiberglass | 100 | — |
| Phenolic resin | 30 to 50 | 5 to 30 |
| Plasticizer: Propanetrimethylol-acrylic ester | 4 to 20 | 30 to 100 |
| Additives: Lauric acid | 7 to 10 | 1 to 6 |
| Tert.butyl-peroxy-isopropyl-benzene | 8 to 15 | 2 to 6 |

* * * * *